(12) United States Patent
Qi et al.

(10) Patent No.: US 11,943,695 B2
(45) Date of Patent: Mar. 26, 2024

(54) NETWORK CHANNEL SWITCHING METHOD AND APPARATUS, DEVICE, AND STORAGE MEDIUM

(71) Applicant: ESPRESSIF SYSTEMS (SHANGHAI) CO., LTD., Shanghai (CN)

(72) Inventors: Yuexia Qi, Shanghai (CN); Jiangjian Jiang, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 395 days.

(21) Appl. No.: 17/413,442

(22) PCT Filed: Dec. 3, 2019

(86) PCT No.: PCT/CN2019/122705
§ 371 (c)(1),
(2) Date: Jun. 11, 2021

(87) PCT Pub. No.: WO2020/119523
PCT Pub. Date: Jun. 18, 2020

(65) Prior Publication Data
US 2022/0060961 A1 Feb. 24, 2022

(30) Foreign Application Priority Data
Dec. 12, 2018 (CN) .......................... 201811520852.8

(51) Int. Cl.
*H04W 40/02* (2009.01)
*H04W 40/24* (2009.01)
(Continued)

(52) U.S. Cl.
CPC ......... *H04W 40/02* (2013.01); *H04W 40/246* (2013.01); *H04W 40/248* (2013.01); *H04W 48/16* (2013.01); *H04W 84/18* (2013.01)

(58) Field of Classification Search
CPC . H04W 40/02; H04W 40/245; H04W 40/248; H04W 48/16; H04W 84/18
(Continued)

(56) References Cited

U.S. PATENT DOCUMENTS 6,654,353 B1 * 11/2003 Tokura .................. H04L 12/437
370/254
8,364,085 B2 * 1/2013 Barnum ................ H04W 8/005
370/386

(Continued)

FOREIGN PATENT DOCUMENTS

EP 2234337 A2 9/2010

OTHER PUBLICATIONS

Office Action and Search Report from corresponding Chinese Application No. 201811208528 (Publication No. CN109379772) dated Feb. 25, 2020.

(Continued)

*Primary Examiner* — Jean A Gelin
(74) *Attorney, Agent, or Firm* — Aird & McBurney LP

(57) ABSTRACT

Embodiments of the present invention disclose a network channel switching method and apparatus, a device, and a storage medium. The method comprises: acquiring network channel switching information sent by an upper-level parent-node device having a connection relationship, and sending the network channel switching information to a lower-level child-node device having a connection relationship; and switching, according to the received network channel switching information, from a current channel to a target channel. The technical solution in the embodiments of the (Continued)

present invention can greatly improve the success rate of each node device receiving network channel switching information in a mesh network, such that channel switching across the entire mesh network can be achieved while maintaining connections between the node devices in the network, thereby improving the efficiency of channel switching in the mesh network.

15 Claims, 4 Drawing Sheets

(51) Int. Cl.
*H04W 48/16* (2009.01)
*H04W 84/18* (2009.01)
(58) Field of Classification Search
USPC .......................................................... 370/329
See application file for complete search history.

(56) References Cited

U.S. PATENT DOCUMENTS

| | | | |
|---|---|---|---|
| 2006/0271703 A1* | 11/2006 | Kim ...................... | H04W 48/08 709/239 |
| 2009/0129273 A1 | 5/2009 | Zou | |
| 2009/0219909 A1* | 9/2009 | Ko ........................ | H04W 36/06 370/343 |
| 2011/0199980 A1* | 8/2011 | Denteneer ........... | H04W 74/002 370/328 |
| 2013/0070648 A1* | 3/2013 | Kubo .................. | H04W 72/535 370/255 |
| 2013/0223334 A1* | 8/2013 | Guo ..................... | H04W 48/16 370/328 |
| 2015/0071295 A1* | 3/2015 | Hui ....................... | H04L 45/306 370/400 |
| 2015/0208320 A1* | 7/2015 | Alexander .......... | H04W 40/244 370/254 |
| 2015/0264589 A1* | 9/2015 | Kalkunte ............ | H04W 56/002 370/329 |
| 2017/0041954 A1* | 2/2017 | Tsai ........................ | G01S 7/021 |
| 2018/0213580 A1 | 7/2018 | Taskin et al. | |
| 2019/0327170 A1* | 10/2019 | Huang .................... | H04L 12/66 |
| 2021/0282212 A1* | 9/2021 | Maruhashi ............ | H04W 76/20 |
| 2022/0124607 A1* | 4/2022 | Zhao ..................... | H04W 24/02 |

OTHER PUBLICATIONS

Office Action from corresponding Chinese Application No. 20181120852.8 (Publication No. CN109379772) dated Aug. 4, 2020.
International Search Report from WO 2020/119523 A1.
CN101621836A—cited in Chinese Office Action dated Feb. 25, 2020 A1 Search Report (with EN cover page).
CN101917749A—cited in ISR (with EN cover page).
CN102291794A—cited in Chinese Office Action dated Feb. 25, 2020 Search Report (with EN cover page).
CN102685917A—cited in Chinese Office Action dated Feb. 25, 2020 Search Report (with EN cover page).
CN103974363A—cited in ISR (with EN cover page).
CN104348888A—cited in ISR (with EN cover page).
CN106879039A—cited in Chinese Office Action dated Feb. 25, 2020 Search Report (with EN cover page).
CN108289288A—cited in Chinese Office Action dated Feb. 25, 2020 Search Report (with EN cover page).
CN109379772A—CN Priority (with EN cover page).

* cited by examiner

NETWORK CHANNEL SWITCHING METHOD AND APPARATUS, DEVICE, AND STORAGE MEDIUM

TECHNICAL FIELD

Embodiments of the present disclosure relate to the technical field of network communication, and in particular to a network channel switching method, apparatus, device, and storage medium.

BACKGROUND ART

With the continuous development of wireless mesh networks, the number of node devices contained in a mesh network is constantly increasing and may reach tens or even hundreds of node devices. Presently, when a channel for a router connected to a mesh network is changed, a root node device of the mesh network receives channel switching information from the router, then performs channel switching merely depending on reliable processing between it and the router, and sends the channel switching information to other node devices in the mesh network through broadcast, such that the other node devices in the mesh network may perform channel switching. However, due to network congestion or interference among node devices in the mesh network, it is possible that a large number of node devices in the mesh network may not receive the channel switching information, and thus the efficiency of channel switching in mesh networks is reduced.

SUMMARY OF THE INVENTION

In embodiments of the present disclosure, a network channel switching method, apparatus, device, and storage medium are provided, by means of which a success rate of each node device in a mesh network receiving network channel switching information may be significantly improved, such that the channel switching of the entire mesh network may be completed while connections of every node device in the network may be maintained, thereby improving the efficiency of channel switching in the mesh network.

In a first aspect, an embodiment of the present disclosure provides a network channel switching method, comprising:

obtaining network channel switching information sent by an upper-level parent node device having a connection relationship therewith and sending the network channel switching information to at least a lower-level child node device having a connection relationship therewith; and switching from a current channel to a target channel according to the received network channel switching information.

In a second aspect, an embodiment of the present disclosure also provides a network channel switching apparatus, comprising:

an information transceiving module, configured to obtain network channel switching information sent by an upper-level parent node device having a connection relationship therewith and send the network channel switching information to at least a lower-level child node device having a connection relationship therewith; and a channel switching module, configured to switch from a current channel to a target channel according to the received network channel switching information.

In a third aspect, an embodiment of the present disclosure also provides a device, comprising:

one or more processors;

a storage device for storing one or more programs, wherein the one or more programs, when executed by the one or more processors, cause the one or more processors to perform a network channel switching method as described in any embodiment of the present disclosure.

In a fourth aspect, an embodiment of the present disclosure also provides a computer readable storage medium with a computer program stored thereon, wherein the program, when executed by one or more processors, performs a network channel switching method as described in any embodiment of the present disclosure.

According to the solution in the embodiments of the present disclosure, each node device in the mesh network obtains network channel switching information sent by an upper-level parent node device, then sends the network channel switching information to lower-level child node devices, and performs channel switching according to the received network channel switching information. In this manner, a success rate of each node device in the mesh network receiving the network channel switching information may be greatly improved, such that the channel switching of the entire mesh network may be completed while connections of every node device in the network may be maintained, and the efficiency of channel switching in the mesh network may be improved.

DETAILED DESCRIPTION OF THE PREFERRED EMBODIMENTS

Figure 1:
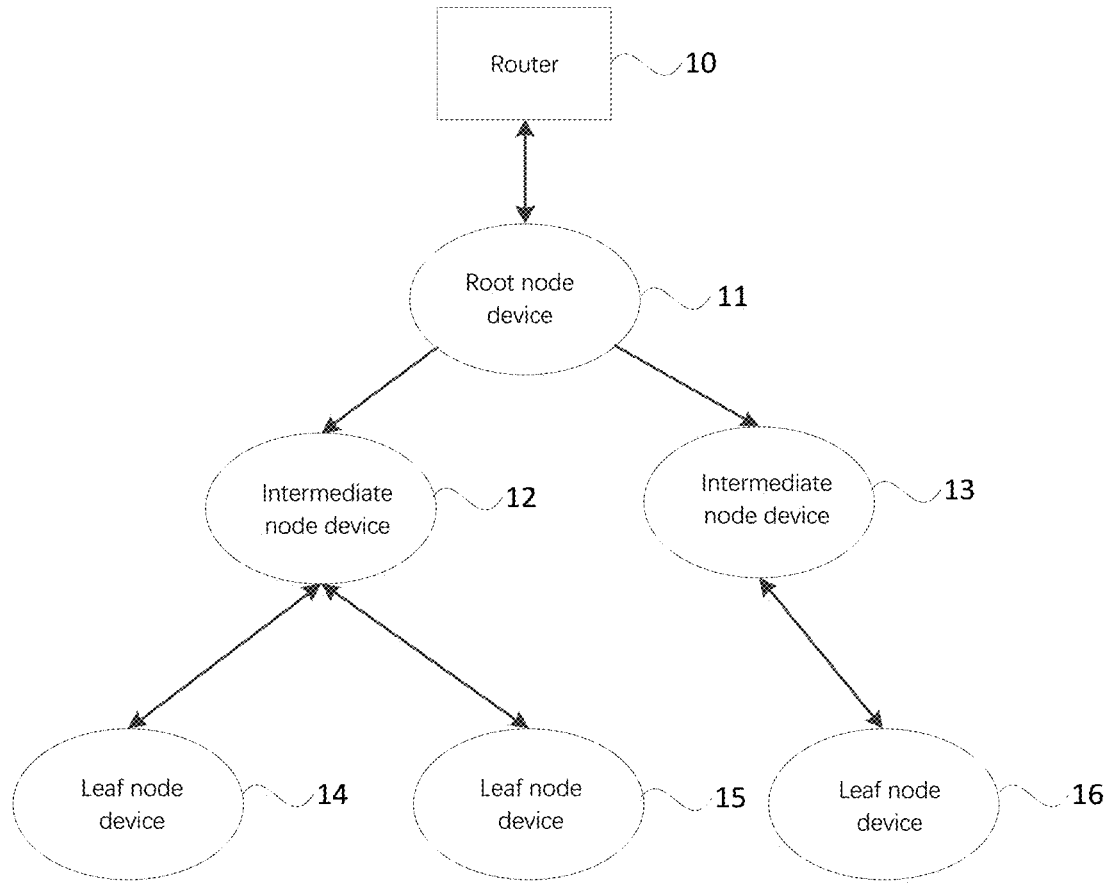
FIG. 1 is a schematic structural diagram of a mesh network provided in an embodiment of the present disclosure.

The present disclosure will be further described in detail with reference to the drawings and embodiments. It will be understood that the specific embodiments described herein are only used to explain rather than limit the present disclosure. It should be also noted that for convenience of description, only some, but not all, of the structures relating to the present disclosure are shown in the drawings.

Before describing the embodiments of the present disclosure, the application scenarios of the embodiments of the present disclosure will be explained. The network channel switching method, apparatus, device, and storage medium in the embodiments of the present disclosure may be applied to channel migration of wireless mesh networks (e.g., mesh networks). A mesh network may be composed of a router and a plurality of node devices. Such a mesh network may be constructed by a point-to-point or point-to-multipoint topology among node devices. As shown in FIG. 1, the mesh network includes a router 10, a root node device 11, intermediate node devices 12-13, and leaf node devices 14-16. The intermediate node device 13 is connected to the leaf node device 16 in a point-to-point manner, the root node device 11 is connected to the intermediate node device 12 and the intermediate node device 13 in a point-to-multipoint manner, and the intermediate node device 12 is connected to the leaf node device 14 and the leaf node device 15 in a point-to-multipoint manner.

The node devices in a wireless mesh network may be divided into levels according to a direct or indirect connection relationship among the node devices and the router: the node devices directly connected to the router may be regarded as first-level node devices, such as the root node device 11 in FIG. 1; the node devices indirectly connected to the router through one node device may be regarded as second-level node devices, such as the intermediate node devices 12-13 in FIG. 1; and the node devices indirectly connected to the router through two node devices may be regarded as third-level node devices, such as the leaf node devices 14-16 in FIG. 1, and so on.

In embodiments of the present disclosure, taking the mesh network shown in FIG. 1 as an example, a channel switching method in a wireless mesh network according to embodiments of the present disclosure is further explained in detail. It can be understood that the mesh network in FIG. 1 described herein is only used for explaining rather than limiting the present disclosure. The network applicable to the network channel switching method provided in embodiments of the present disclosure may include any network that is composed of a plurality of node devices having parent-child node connection relationships. It should be also noted that for convenience of description, only some, but not all, of the structures relating to the present disclosure are shown in the drawings.

First Embodiment

Figure 2:
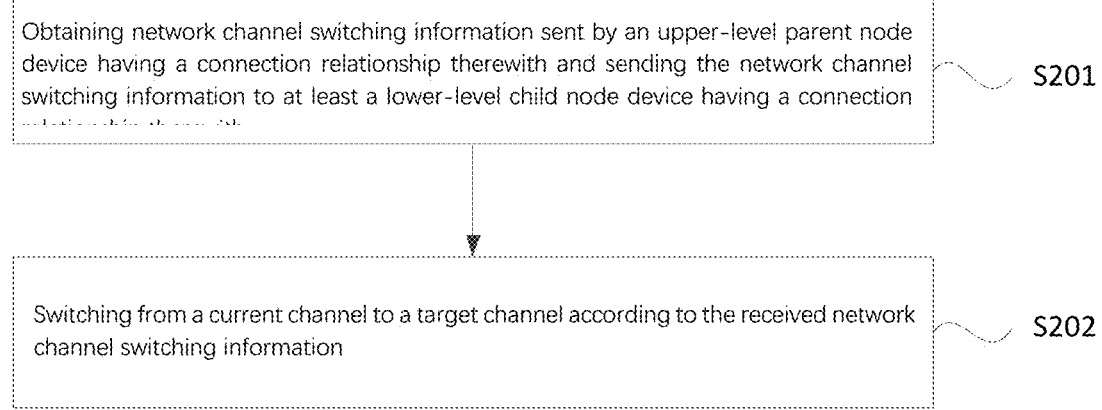
FIG. 2 is a flow chart of a network channel switching method provided in a first embodiment of the present disclosure.

FIG. 2 is a flow chart of a network channel switching method provided in the first embodiment of the present disclosure. This embodiment may be applicable to implement channel switching in a network that is composed of a plurality of node devices having parent-child node connection relationships, such as to implement channel switching in a mesh network. The method may be performed by a network channel switching apparatus provided in an embodiment of the present disclosure, which may be implemented in hardware and/or software, for example, may be configured in any node device in the mesh network. The node devices in the wireless mesh network may include smart phones, smart TVs, smart stereos, tablet computers, or wearable devices. As shown in FIG. 2, the method specifically includes the following steps:

In S201, network channel switching information sent by an upper-level parent node device having a connection relationship therewith is obtained, and the network channel switching information is sent to at least a lower-level child node device having a connection relationship therewith.

The network channel switching information may be information related to a Channel Switch Announcement (CSA) defined in Wireless-Fidelity (Wi-Fi) protocols, which may be used as information for instructing each node device in the network to perform channel switching. The network channel switching information may include, but not limited to, information such as a channel switching latency value (csa_count), a target channel to be switched to (csa_newchan), and a node state. Specifically, the channel switching latency value may be used to represent the number of beacons that each node device has to wait from receiving the network channel switching information to performing a channel switching. The timing for each node device to perform channel switching may be determined from the channel switching latency value. The target channel to be switched to may refer to a channel to be switched to by the current node device, i.e., the channel to be switched to by the mesh network, which is also the channel that the router in the mesh network has been switched to. The node state may be the state of the node device sending the network channel switching information, such as a connectable state (i.e., AP state) and a unconnectable state (i.e., station state).

It should be noted that the embodiments of the present disclosure may be performed by any node device in the mesh network. Every node device in the mesh network may perform the operations described in the embodiments of the present disclosure; that is, the channel switching of the entire mesh network may be completed while connections of every node device in the network may be maintained. In the present embodiment, the current node device may be an arbitrary node device in the mesh network, and the current node device performing the method in the embodiments of the present disclosure will be described hereinafter as an example.

An upper-level parent node device having a connection relationship therewith may be a node device in the mesh network that is connected to the current node device and at an upper level of the current node device. As shown in FIG. 1, if the current node device is the intermediate node device 12, the upper-level parent node device having a connection relationship with the intermediate node device 12 may be the root node device 11. Optionally, if the current node device is the root node device 11, the upper-level parent node device having a connection relationship with the root node device 11 may be the router 10. The at least a lower-level child node device having a connection relationship therewith may be a node device in the mesh network that is connected to the current node device and is at a lower level of the current node device. As shown in FIG. 1, if the current node device is the intermediate node device 12, the lower-level child node devices having a connection relationship with the intermediate node device may be the leaf node device 14 and the leaf node device 15.

Optionally, in the embodiments of the present disclosure, the current node device may receive network channel switching information sent by an upper-level parent node device connected with it, and then send the network channel switching information to the lower-level child node devices connected with it. Specifically, the receiving and sending process may include the following three steps.

A) The network channel switching information broadcasted via a beacon of the upper-level parent node device having a connection relationship therewith is received.

A beacon may be a way for sending and receiving messages between node devices in a mesh network, and each node device has its own beacon. In the present embodiment, each node device may send the network channel switching information to at least a lower-level child node device via its own beacon. For example, when a node device is to send information to another node device in the network, the node device may add the information to be sent to its own beacon, and then send the information to be sent to the entire network via the beacon through a network-wide broadcast.

Exemplarily, the upper-level parent node device of the current node device adds the network channel switching information to a beacon of the parent node device and sends the network channel switching information to the wireless mesh network through a network-wide broadcast. The current node device monitors and receives the information sent via the beacon of the upper-level parent node; that is, the network channel switching information sent by the upper-level parent node device of the current node device is obtained. Optionally, in addition to the network channel switching information, the information broadcasted via the beacon of the upper-level parent node device may also include an identifier of the parent node device and/or an identifier of a lower-level child node device of the parent node device (i.e., the current node device), so as to determine the receiver to which the information is sent.

B) The received network channel switching information is added to a beacon of the node device itself.

Optionally, in an embodiment of the present disclosure, the process of the node device adding the obtained network channel switching information to a beacon of the node device itself may be as follows: directly adding the network channel switching information obtained from the upper-level parent node device to the beacon of the node device itself, or encrypting the network channel switching information obtained from the upper-level parent node device and then adding it to the beacon of the node device itself, so as to ensure the security of information transmission and prevent the information from being monitored by other node device. In the present embodiment, the specific encryption algorithm is not limited, which may be, for example, public-private key encryption algorithm, hash encryption algorithm, digital signature algorithm, and so on. Accordingly, if the network channel switching information that is added to the beacon by the parent node device connected to the child node device for receiving the network channel switching information is unencrypted, the information may be directly obtained; if the network channel switching information that is added to the beacon is encrypted, the obtained information may be decrypted according to a preset algorithm to obtain the network channel switching information.

Optionally, different node devices in the mesh network may encrypt the network channel switching information and decrypt the received data information broadcasted via the beacon with a same encryption algorithm; or, each node device may have its own beacon encryption algorithm, and only the node device and its lower-level child node devices know the encryption and decryption algorithm of the beacon data of the node device, which is used by the node device to encrypt the network channel switching information and decrypt the data information of the obtained beacon broadcast of the parent node.

C) The network channel switching information in the beacon of the node device itself is sent to the at least a lower-level child node device having a connection relationship therewith through a network-wide broadcast.

Exemplarily, when a current node device sends a beacon to the lower-level child node devices connected with it, the current node device may send the network channel switching information in its own beacon to the lower-level child node devices through a network-wide broadcast. Optionally, the current node device may send the network channel switching information in its own beacon to all node devices in the wireless mesh network through a network-wide broadcast, but only the lower-level child node devices in the wireless mesh network that have a connection relationship with the current node device will receive the network channel switching information sent by the current node device.

It should be noted that, in the embodiment of the present disclosure, if the node device in the mesh network is a root node device, the network channel switching information sent by a router will be obtained, and the network channel switching information will be sent to lower-level child node devices having a connection relationship with the root node device. If the node device in the wireless mesh network is not a root node device, the network channel switching information sent by an upper-level parent node having a connection relationship therewith will be obtained, and the network channel switching information will be sent to the lower-level child node devices having a connection relationship therewith. If the node device in the mesh network is a bottom-level node device and does not have a lower-level child node device having a connection relationship therewith, the bottom-level node device will only obtain the network channel switching information sent by the upper-level parent node device having a connection relationship therewith and will not proceed to send the network channel switching information.

Optionally, if the network quality is poor or there are interferences among devices, in order to ensure that the node devices in the wireless mesh network can still receive the network channel switching information, the current node device may send the network channel switching information to the lower-level child node devices connected with it according to a preset beacon interval for multiple times. Specifically, it is possible that the number of times a current node device sends the network channel switching information to its lower-level child node devices may be the same as the number of times the current node device receives the network channel switching messages sent from the upper-level parent node device. The number of times a root node device connected to a router in the wireless mesh network sends the network channel switching information to its lower-level child node devices may be determined according to the channel switching information sent from the router and/or a preset rule.

In S202, switching from a current channel to a target channel according to the received network channel switching information is performed.

The current channel may be the channel where the current node device is currently in, i.e., the channel where the mesh network was in before the switching of the channel. The target channel may be the channel that the current node device will switch to, i.e., the channel that the mesh network will switch to, or the channel that the router in the mesh network has switched to.

Optionally, in an embodiment of the present disclosure, the specific process of switching from a current channel to a target channel according to the received network channel switching information may include the following three steps.

A) A channel switching latency value and a target channel to be switched in the network channel switching information are obtained.

For example, the channel switching latency value and the target channel to be switched to may be contained in the network channel switching information in an unencrypted or encrypted form. Accordingly, obtaining the channel switching latency value and the target channel to be switched to in the network channel switching information may include obtaining the channel switching latency value and the target channel to be switched to directly from the network channel switching information, or decrypting the network channel switching information to obtain the channel switching latency value and the target channel to be switched to.

B) A latency time period to perform the network channel switching is determined according to the channel switching latency value.

For example, the specific manner for determining a latency time period to perform the network channel switching according to the channel switching latency value may include multiplying the channel switching latency value with a preset beacon interval to obtain the latency time period to perform the network channel switching. Optionally, the preset beacon interval may be a preset beacon interval that is set for the mesh network according to the current network quality, information transmission rate and etc. and which may be the default for the node devices in the network. Alternatively, the preset beacon interval may be a preset beacon interval that is set by each node device according to its own characteristics. In this regard, there is no any limit thereto imposed by the present embodiment.

C) The switching from the current channel to the target channel is performed when the latency time period is lapsed.

For example, a timer in the current node device may start timing when the current node device receives the network channel switching information sent by its parent node device or when the current node device sends the network channel switching information to its lower-level child node devices for the first time. When the latency time period is lapsed, the timer will trigger to control the current node device to switch from the current channel to the target channel.

It should be noted that there is a router in the mesh network and the root node device obtains the network channel switching information from the router, according to an embodiment of the present disclosure. However, the source of the network channel switching information is not limited to the router, and may also include other sources. For example, after the root node device in the mesh network is disconnected from the router, the root node device may trigger all-channel scanning, search for the historically connected router, obtain the channel switching latency value of the router (the channel switching latency value may also be generated according to its own network quality) and the target channel to be switched to, and generate the network channel switching information. Alternatively, after another node device other than the root node device in the mesh network is disconnected from the parent node device having a connection relationship therewith, the another node device may trigger all-channel scanning, search for a previous upper-level parent node device or a new upper-level parent node device having a connection relationship therewith, and obtain the channel switching latency value (the channel switching latency value can also be generated according to its own network quality) and the target channel to be switched to from the previous upper-level parent node device or the new upper-level parent node device having a connection relationship therewith, and generate the network channel switching information. Further, in a scenario that there is no router included in the mesh network, the network channel switching information may be generated according to a channel to be switched to and a channel switching latency value, in which the channel to be switched to is set by the user and the channel switching latency value is generated based on its own network quality. In this regard, there is no any limit thereto imposed by the present embodiment.

In the present embodiment, a network channel switching method is provided, in which each node device in the mesh network obtains network channel switching information sent by an upper-level parent node device, then sends the network channel switching information to lower-level child node devices, and performs a channel switching according to the received network channel switching information. In this manner, a success rate of each node device in the mesh network receiving network channel switching information may be greatly improved, such that the channel switching of the entire mesh network may be completed while connections of every node device in the network may be maintained, and the efficiency of channel switching in the mesh network may be improved.

Further, since the network channel switching information sent to the mesh network by different routers may be different, the channel switching latency value in each network channel switching information may also be different. If the channel switching latency value is relatively small, the upper-level parent node device may switch to the target channel before the node devices in the whole network all receive the information. Due to this, the node devices that have not received the information may be disconnected from the upper-level parent node device and then exit the mesh network. In an embodiment of the present disclosure, in order to avoid such a problem, after the root node device in the mesh network obtains the network channel switching information sent by the router, the method further includes: adjusting the channel switching latency value in the network channel switching information according to the current network quality, in which the channel switching latency value may be used to determine a latency time period for each node device to perform a network channel switching. Specifically, when the root node device adds the received network channel switching information to its own beacon, the root node device may appropriately increase the channel switching latency value in the network channel switching information according to the current network conditions (e.g., long beacon transmission period or significant interference). Therefore, the time that the entire network completes channel migration is not dependent on the configuration of the router anymore, but on the state of the network itself. As such, the channel switching of the entire network may be completed while the connections of every node device in the network may be maintained, and the efficiency of the network channel switching is improved.

Second Embodiment

Figure 3:
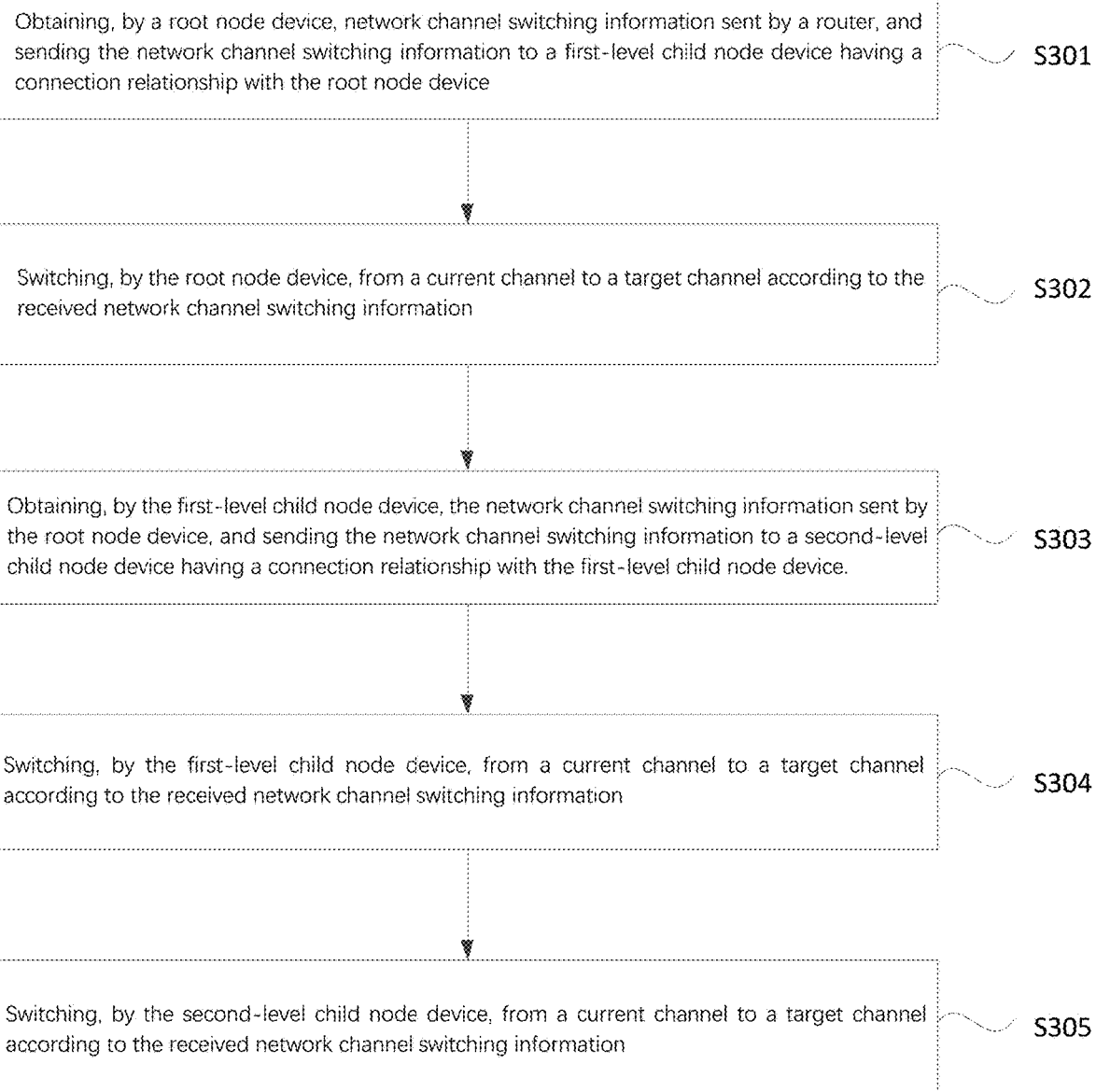
FIG. 3 is a flow chart of a network channel switching method provided in a second embodiment of the present disclosure.

FIG. 3 is a flow chart of a network channel switching method provided in the second embodiment of the present disclosure. The network channel switching method is further optimized on the basis of the above embodiments, and specifically provides a preferred embodiment of a channel switching method in a mesh network with two levels of child node devices. In conjunction with the schematic structural diagram of the mesh network shown in FIG. 1, the network channel switching method shown in FIG. 3 is described, and the method includes the following steps.

In S301, a root node device obtains network channel switching information sent by a router, and sends the network channel switching information to at least a first-level child node device having a connection relationship with the root node device.

The first-level child node device may refer to one or more child node devices having a connection relationship with the first-level node device (i.e., the root node device).

As an example, the root node device 11 in the mesh network receives the network channel switching information sent by the router 10, adds the network channel switching information to its own root node beacon, and sends the network channel switching information to first-level child node devices (i.e., the intermediate node device 12 and the intermediate node device 13) connected to it in the wireless mesh network through a network-wide broadcast. Optionally, the root node device 11 may send the network channel switching information to the intermediate node device 12 and the intermediate node device 13 according to a preset beacon interval for multiple times, i.e., once every preset bacon interval. For example, the network channel switching information may be added to ten beacons and sent to the intermediate node device 12 and the intermediate node device 13 for ten times according to the preset beacon interval.

In S302, the root node device switches from a current channel to a target channel according to the received network channel switching information.

As an example, the root node device 11 obtains the channel switching latency value and the target channel to be switched to from the received network channel switching information. A latency time period to perform a network channel switching is determined according to the channel switching latency value. For example, the latency time period to perform a channel switching may be calculated according to the formula of $T = csa\_count \times TBTT$, where $T$ is the latency time period to perform the channel switching, $csa\_count$ is the channel switching latency value, and TBTT (Target Beacon Transmission Time) is the preset beacon interval. Then, a timer in the root node device 11 performs a timing operation, and the switching from a current channel to a target channel is preformed when the calculated channel switching latency time period is lapsed.

In S303, the first-level child node device obtains the network channel switching information sent by the root node device, and sends the network channel switching information to at least a second-level child node device having a connection relationship with the first-level child node device.

The second-level child node device may refer to at least a child node device having a connection relationship with the second-level node device (e.g., intermediate node device).

As an example, the intermediate node device 12 of the first-level child node devices in the mesh network receives the network channel switching information sent by the root node device 11, adds the network channel switching information to its own beacon, and sends the network channel switching information to second-level child node devices connected to it in the mesh network through a network-wide broadcast, i.e., the leaf node device 14 and the leaf node device 15. Optionally, the number of times the intermediate node device 12 sends network channel switching information to the leaf node devices 14 and 15 may be dependent on the number of times the intermediate node device 12 receives the network channel switching information sent by the root node device 11. For example, if the intermediate node device 12 receives the network beacon sent by the root node device 11 for eight times, the intermediate node device 12 may send the network channel switching information to the leaf node device 14 and the leaf node device 15 for eight times.

It should be noted that the first-level child node devices shown in FIG. 1 include the intermediate node device 12 and the intermediate node device 13. The present step is described by taking the intermediate node device 12 as an example here. The process that the intermediate node device 13 receives the network channel switching information sent by the root node device 11 and sends the network channel switching information to the leaf node device 16 connected with it is the similar to the above process, and will not be repeated here.

In S304, the first-level child node device switches from a current channel to a target channel according to the received network channel switching information.

As an example, the intermediate node device 12 and the intermediate node device 13 among the first-level child node devices obtain the channel switching latency value and the target channel to be switched to from the received network channel switching information. The latency time period to perform the network channel switching is determined according to the channel switching latency value. For example, the latency time period to perform the channel switching may be calculated according to the formula of $T = csa\_count \times TBTT$, where $T$ is the channel switching latency time period, $csa\_count$ is the channel switching latency value, and TBTT is the preset beacon interval. Then, the timers in the intermediate node device 12 and the intermediate node device 13 perform timing operations respectively, and the switching from a current channel to a target channel is performed when the corresponding calculated channel switching latency time period is lapsed.

Optionally, the intermediate node device 12 and the intermediate node device 13 may receive the network channel switching information more than once; hence, when the timing for the switching waiting time period is performed, for example after the network channel switching information is received for the first time, a switching latency time is determined, and the timing operation is started.

In S305, the second-level child node device switches from a current channel to a target channel according to the received network channel switching information.

As an example, the leaf node devices 14 to 16 among the second-level child node devices obtain the channel switching latency value and the target channel to be switched to from the received network channel switching information. The latency time period to perform the network channel switching is determined according to the channel switching latency value. For example, the latency time period to perform the channel switching may be calculated according to the formula of $T = csa\_count \times TBTT$, where $T$ is the channel switching latency time period, $csa\_count$ is the channel switching latency value, and TBTT is the preset beacon interval. Then, the timers in the leaf node devices 14 to 16 perform the timing operations respectively, and the switching from a current channel to a target channel is performed when the corresponding calculated channel switching latency time period is lapsed.

Similarly, the leaf node devices 14 to 16 may receive the network channel switching information more than once; hence, when the timing for the switching latency time period is performed, for example after the network channel switching information is received for the first time, a switching latency time is determined, and the timing operation is started.

In the present embodiment, a network channel switching method is provided. According to the network channel switching method provided in present disclosure, the channel switching in the entire mesh network is completed while the connection of each node device in the entire mesh network (composed of three levels of node devices) is maintained, and the efficiency of the channel switching of the mesh network is improved.

Third Embodiment

Figure 4:
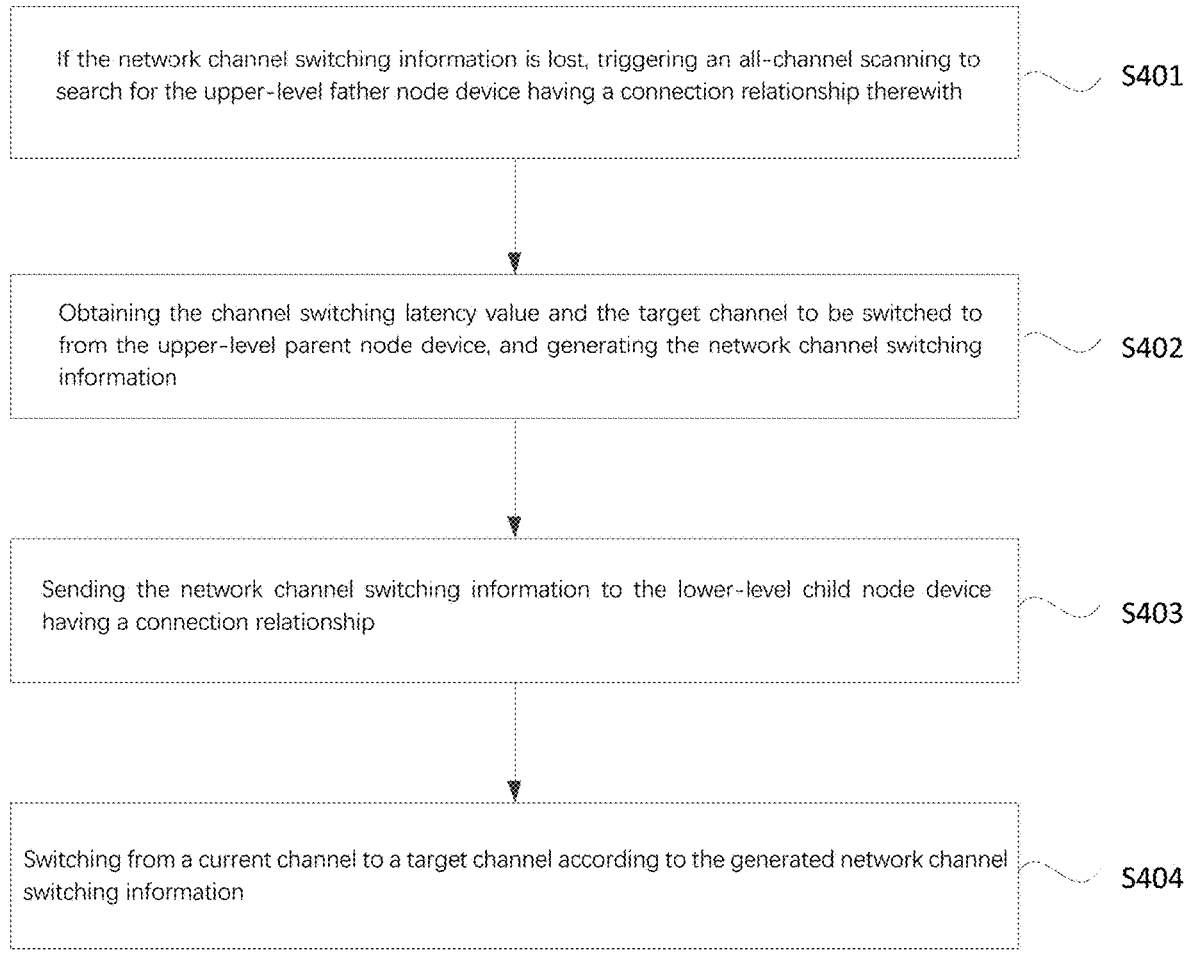
FIG. 4 is a flow chart of a network channel switching method provided in a third embodiment of the present disclosure.

FIG. 4 is a flow chart of a network channel switching method provided in the third embodiment of the present disclosure. The network channel switching method is further optimized on the basis of the above embodiments, and specifically describes the specific situation of network channel switching when the node device in the mesh network has lost the network channel switching information. As shown in FIG. 4, the method includes the following steps.

In S401, if the network channel switching information is lost, an all-channel scanning is triggered to search for the upper-level parent node device having a connection relationship therewith.

As an example, since the network channel switching information is added to a beacon and sent through a broadcast, and there are interferences among the node devices in the mesh network, some node devices in the network may have lost the network channel switching information. Optionally, in the process of obtaining the network channel switching information sent by the upper-level node device having a connection relationship therewith, the loss of the network channel switching information happens at least in the following two situations: (1) the node device obtains and checks the network channel switching information (e.g., performs a CRC check on the network channel switching information); if the check fails, the node device may discard the received network channel switching information, and thus the network channel switching information is lost by the node device; (2) due to poor network quality, interferences among the node devices, insufficient memory of the node devices, or other reasons, the network channel switching information is never obtained in the process of obtaining the network channel switching information. At this time, some node devices in the mesh network may exit the network because these node devices have lost the network channel switching information and have not completed the channel migration. To solve the above problems, when the current node device has lost the network channel switching information and the upper-level parent node device has finished channel switching, that is, the current node device and the upper-level parent node device are in two different channels, the current node device may trigger an all-channel scanning to search for the upper-level parent node device having a connection relationship with the current node from all channels.

Optionally, if a root node device in the wireless mesh network loses the network channel switching information, the root node device may trigger an all-channel scanning to search for a historically connected router. For example, according to the identification information of the historically connected router, the root node device may scan out the router with the identification information from all channels. If a non-root node device in the mesh network loses the network channel switching information, the non-root node device may trigger the all-channel scanning in the mesh network to search for the upper-level parent node device having a connection relationship with the current node device in the mesh network. For example, the current node device may scan all channels in the mesh network according to the identification of the upper-level parent node device having a connection relationship therewith to search for the node device with the identification of the upper-level parent node device.

Optionally, in order to improve the channel switching efficiency of the entire mesh network, a preset time period (e.g., one minute) may be set when searching for the upper-level parent node device for the node device that has lost the network channel switching information, and the search range may be expanded if the upper-level node device is not found within the preset time period.

Optionally, if the node device that has lost the network channel switching information in the mesh network is a root node device, the entire mesh network cannot carry out channel migration. In this case, when the root node device does not scan out a router historically connected with the root node device within the preset time period, a router failure may have happened. Therefore, in order to ensure the normal networking of the entire mesh network, the root node may search for other standby routers in the mesh network and take one of the other standby routers identified from the search as the upper-level parent node device having a connection relationship therewith. Specifically, the root node device in the mesh network stores not only the identification information of the historically connected router but also the identification information of at least one standby router. At this time, all-channel scanning may be performed according to the identification information of at least one standby router and the identification information of the historically connected router. When a router with a same identification information is scanned out, the router may be taken as the upper-level parent node device having a connection relationship with the root node device.

If the node device losing the network channel switching information in the mesh network is a non-root node device and the non-root node device fails to scan out an upper-level parent node device having a connection relationship therewith within the preset time period, another node device in the mesh network may be searched for; and the another node device identified from the search may be taken as the upper-level parent node device having a connection relationship therewith. The process of searching for the another node device in the mesh network may include scanning out the another node device that also stores the mesh network identification according to a wireless mesh network identification stored in advance; when a node device that stores the identification is scanned out, the node device may be taken as the upper-level parent node device having a connection relationship therewith.

In S402, the channel switching latency value and the target channel to be switched to are obtained from the upper-level parent node device, and the network channel switching information is generated.

Optionally, in the present embodiment, the channel switching latency value and the target channel to be switched to may be obtained from an upper-level parent node device in various ways. For example, the channel switching latency value and the target channel to be switched to may be obtained by communicating with the upper-level node device and requesting the upper-level node device to send the channel switching latency value and the target channel to be switched to. Alternatively, the channel switching latency value may be determined according to the current network quality and a preset rule by taking the channel where the scanned out upper-level parent node device is in as the target channel to be switched to. In this regard, there is no any limit thereto imposed by the present embodiment.

Optionally, in the present embodiment, the process of generating the network channel switching information after the channel switching latency value and the target channel to be switched to are obtained by the current node device may include combining and/or encrypting the channel switching latency value, the target channel to be switched to and the state information of the current node to generate the network channel switching information. Other ways can also be adopted to generate the network channel switching information according to the channel switching latency value and the target channel to be switched to. In this regard, there is no any limit in the present embodiment.

Optionally, if a root node device in the mesh network lost the network channel switching information, the root node device may trigger an all-channel scanning to search for the historically connected router, and then obtains the channel switching latency value and the target channel to be switched to from a historically connected router and generates the network channel switching information. If a non-root node device in the wireless mesh network lost the network channel switching information, the non-root node device may trigger an all-channel scanning to search for the upper-level parent node device having a connection relationship therewith, and then obtains the channel switching latency value and the target channel to be switched to from the upper-level parent node device having a connection relationship therewith, and generates the network channel switching information. If there is no router in the mesh network, the node device in the mesh network may generate the network channel switching information according to the channel to be switched to set by the user and the channel switching latency value generated according to the network quality.

In S403, the network channel switching information is sent to the at least a lower-level child node device having a connection relationship therewith.

As an example, after regenerating the network channel switching information, the node device that has lost the network channel switching information in the mesh network may not immediately perform a channel switching, but instead send the channel switching information to the lower-level child node devices having a connection relationship therewith so as to ensure that the lower-level child node devices can perform a channel switching according to the channel switching information, and then proceed to step S404 to switch from the current channel to the target channel according to the generated network channel switching information, that is, to establish a connection relationship with another node device that has been identified from the searched(the previous or new upper-level parent node device having a connection relationship therewith).

In S404, the switching from a current channel to a target channel is performed according to the generated network channel switching information.

In the present embodiment, a network channel switching method is provided. According to this method, when a node device in the network lost network channel switching information, the node device may search for an upper-level parent node device by triggering an entire network scanning, obtain the channel switching latency value and the target channel to be switched to, generate the network channel switching information, then proceed to send the network channel switching information to at least a lower-level child node device, and switch channel according to the generated network channel switching information. Accordingly, in the case that the node device is disconnected from the mesh network or the router due to the loss of the network channel switching information, the network channel switching information may still be determined quickly, so as to complete the channel switching of the entire network, thereby avoiding the situation that node devices in the mesh network are lost in the channel switching process and ensuring the integrity of network channel switching.

Fourth Embodiment

Figure 5:
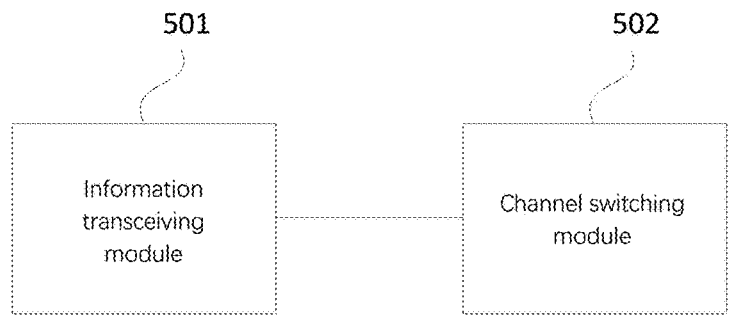
FIG. 5 is a schematic structural diagram of a network channel switching apparatus provided in a fourth embodiment of the present disclosure.

FIG. 5 is a schematic structural diagram of a network channel switching apparatus provided in the fourth embodiment of the present disclosure. The network channel switching device may be configured in a node device in a wireless mesh network, can perform the network channel switching method provided in any embodiment of the present disclosure, and has corresponding functional modules for and advantageous effects from performing the method. As shown in FIG. 5, the apparatus may include:

an information transceiving module 501, configured to obtain network channel switching information sent by an upper-level parent node device having a connection relationship therewith and send the network channel switching information to at least a lower-level child node device having a connection relationship therewith; and a channel switching module 502, configured to switch from a current channel to a target channel according to the received network channel switching information.

The present embodiment provides a network channel switching apparatus, in which each node device in the mesh network may obtain network channel switching information sent by an upper-level parent node device, then sends the network channel switching information to at least a lower-level child node device, and performs a channel switching according to the received network channel switching information, by means of which a success rate of each node device in a mesh network receiving network channel switching information may be greatly improved, such that the channel switching of the entire mesh network may be completed while the connections of every node device in the network may be maintained, and the efficiency of channel switching in the mesh network may be improved.

Further, the information transceiving module 501 is specifically configured to:

receive the network channel switching information broadcasted via a beacon of the upper-level parent node device having a connection relationship therewith;

adding the received network channel switching information to a beacon of the node device itself; and sending the network channel switching information in the beacon of the node device itself to the at least a lower-level child node device having a connection relationship therewith through a network-wide broadcast.

Further, the information receiving and sending module 501 is specifically configured to:

if the node device in the wireless mesh network is a root node device, obtain network channel switching information sent by a router, and send the network channel switching information to the at least a lower-level child node device having a connection relationship with the root node device.

Further, the device may also include:

a latency value adjustment module, configured to adjust a channel switching latency value in the network channel switching information according to the current network quality, in which the channel switching latency value is used to determine a latency time period for each node device to perform a network channel switching.

Further, the channel switching module 502 may be configured to:

obtain a channel switching latency value and a target channel to be switched to in the network channel switching information;

determine a latency time period to perform a network channel switching according to the channel switching latency value; and switch from a current channel to a target channel when the latency time period is lapsed.

Further, the device may also include:

a channel scanning module, configured to trigger an all-channel scanning to search for the upper-level parent node device having a connection relationship therewith if the network channel switching information is lost; and an information generation module, configured to obtain the channel switching latency value and the target channel to be switched to from the upper-level parent node device, and generate network channel switching information.

Further, the channel scanning module may specifically be configured to:

if a root node device in the wireless mesh network lost the network channel switching information, trigger the all-channel scanning to search for a historically connected router;

Accordingly, the information generation module may specifically be configured to:

obtain the channel switching latency value and the target channel to be switched to from the historically connected router, and generate the network channel switching information.

Further, the channel scanning module may also be configured to:

if the node device in the wireless mesh network is a non-root node device and the non-root node device fails to scan out an upper-level parent node device having a connection relationship therewith within a preset time period, search for another node device in the wireless mesh network; and taking the another node device identified from the searching as the upper-level parent node devices having a connection relationship therewith.

Fifth Embodiment

Figure 6:
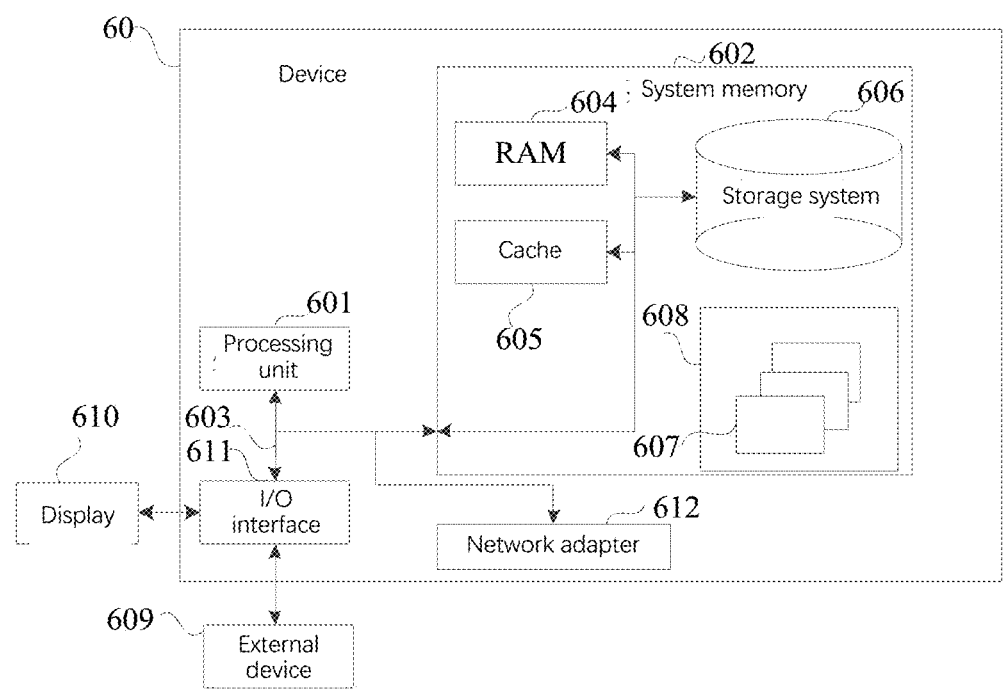
FIG. 6 is a schematic structural diagram of a device provided in a fifth embodiment of the present disclosure.

FIG. 6 is a schematic structural diagram of a device provided in the fifth embodiment of the present disclosure. FIG. 6 illustrates a block diagram of an exemplary device 60 suitable for implementing the embodiments of the present disclosure. The device 60 shown in FIG. 6 is only an example, and should not be constructed as limiting in anyway the functions and application scope of the embodiments of the present disclosure. As shown in FIG. 6, the device 60 is embodied in the form of a general-purpose computing device. The device 60 may be a node device in a network for channel switching. Components of the device 60 may include, but not limited to, one or more processors or processing units 601, a system memory 602, and a bus 603 connecting different system components (including the system memory 602 and the processing unit 601).

The bus 603 represents one or more of several types of bus structures, including a memory bus or a memory controller, a peripheral bus, a graphics acceleration port, a processor, or a local bus using any of a plurality of bus structures. For example, these architectures include, but not limited to, an Industry Standard Architecture (ISA) bus, a Microchannel Architecture (MAC) bus, an Enhanced ISA bus, a video electronics standards association (VESA) local bus, and a Peripheral Component Interconnect (PCI) bus.

The device 60 typically includes a plurality of computer system readable media that may be any available media accessed by the device 60, including volatile and non-volatile media, removable and non-removable media.

The system memory 602 may include computer system readable media in the form of a volatile memory, such as random-access memory (RAM) 604 and/or cache memory 605. The device 60 may further include other removable/non-removable, volatile/non-volatile computer system storage media. By way of example only, the storage system 606 may be used for reading and writing non-removable, non-volatile magnetic media (not shown in FIG. 6, which is commonly referred to as a "hard disk drive"). Although not shown in FIG. 6, a disk drive for reading and writing a removable non-volatile disk (e.g., "floppy disk") and an optical disk drive for reading and writing a removable non-volatile disk (e.g., CD-ROM, DVD-ROM or other optical media) may be provided. In these cases, each drive may be connected to the bus 603 through one or more data medium interfaces. The system memory 602 may include at least one program product having a set (e.g., at least one) of program modules configured to perform the functions of embodiments of the present disclosure.

A program/utility 608 having a set of (at least one) program modules 607 may be stored in, for example, the system memory 602. The program modules 607 may include, but not limited to, an operating system, one or more application programs, other program modules, and program data, and each or some combination of these embodiments may include an implementation of a network environment. The program module 607 typically performs the functions and/or methods in the embodiments described in the present disclosure.

The device 60 may also communicate with one or more external devices 609 (e.g., a keyboard, a pointing device, and a display 610), and may also communicate with one or more devices that enable a user to interact with the device, and/or with any device that enables the device 60 to communicate with one or more other computing devices (e.g., a network card and a modem). This communication may be performed through an input/output (I/O) interface 611. Furthermore, the device 60 can also communicate with one or more networks (e.g., a local area network (LAN), a wide area network (WAN) and/or a public network including the internet) through the network adapter 612. As shown in FIG. 6, the network adapter 612 communicates with other modules of the device 60 through the bus 603. It should be understood that although not shown in the figure, other hardware and/or software modules may be used in conjunction with the device 60, including, but not limited to, a microcode, a device driver, a redundant processing unit, an external disk drive array, a RAID system, a tape drive, and a data backup storage system.

The processing unit 601 executes various functional applications and processes data by running programs stored in the system memory 602, for example, implementing the network channel switching method provided in embodiments of the present disclosure.

Sixth Embodiment

The sixth embodiment of the present disclosure also provides a computer readable storage medium with a computer program stored thereon. When the program is executed by one or more processors, the network channel switching method described in the above embodiment may be achieved.

The computer storage medium of embodiments of the present disclosure may be any combination of one or more computer readable media. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. More specific examples (as a non-exhaustive list) of computer readable storage media may include: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any combination thereof. In the present disclosure, a computer readable storage medium may be any tangible medium containing or storing a program, and the program may be used by or in combination with an instruction execution system, an apparatus or a device.

The computer readable signal medium may include a data signal propagated in baseband or as a part of a carrier wave, in which a computer readable program code is carried. The propagated data signal may take various forms, including but not limited to an electromagnetic signal, an optical signal, or any suitable combination thereof. The computer readable signal medium may also be any computer readable medium other than the computer readable storage medium, which can send, propagate or transmit a program used by or in connection with an instruction execution system, an apparatus, or a device.

The program code contained on the computer readable medium may be transmitted by any suitable medium, including but not limited to wireless, electric wire, optical cable and RF, or any suitable combination thereof.

A computer program code for executing the operations of the present disclosure may be written in one or more programming languages or a combination thereof, including an object-oriented programming language such as Java, Smalltalk, C++, and a conventional procedural programming language such as "C" language or a similar programming language. The program code may be completely executed on a user computer, partially executed on a user computer, executed as an independent software package, partially executed on a user computer and partially executed on a remote computer, or completely executed on a remote computer or server. In a case involving a remote computer, the remote computer may be connected to a user computer through any kind of network including a local area network (LAN) or a wide area network (WAN), or may be connected to an external computer (e.g., connected through the Internet provided by an Internet service provider).

The numbering of the above embodiments are only for description, and do not represent the pros and cons of the embodiments.

It should be understood by those of ordinary skill in the art that the modules or operations of the above embodiments of the present disclosure may be achieved by a general computing device, concentrated on a single computing device or distributed on a network including multiple computing devices, and alternatively achieved by a program code executed by a computer device, so that the modules or operations may be stored in a storage device and executed by the computing device, or made into various integrated circuit modules respectively, or multiple modules or operations among the modules or operations may be made into a single integrated circuit module. Thus, the present disclosure is not limited to any specific combination of hardware and software.

The embodiments in the specification have been described in a progressive manner. What are emphasized in each embodiment are directed to the differences from other embodiments. Identical or similar features among the embodiments may be identified by mutual reference.

The preferred embodiments described herein are for illustration of the present disclosure only but not a limit thereto. For a person of ordinary skill in the art, various modifications or changes may be made to the present disclosure. Any modifications, equivalent substitutions and improvements made within the spirit and principle of the present disclosure should be incorporated in the scope of protection of the present disclosure.

The invention claimed is:

1. A network channel switching method performed by a node device in a wireless mesh network, comprising:
   obtaining network channel switching information sent by an upper-level parent node device having a connection relationship therewith and sending the network channel switching information to at least a lower-level child node device having a connection relationship therewith; and
   switching from a current channel to a target channel according to the received network channel switching information;
   wherein obtaining network channel switching information sent by an upper-level parent node device having a connection relationship therewith comprises:
      if the network channel switching information is lost, triggering an all-channel scanning to search for the upper-level parent node device having a connection relationship therewith;
      obtaining the channel switching latency value and the target channel to be switched to from the upper-level parent node device, and generating the network channel switching information.

2. The method according to claim 1, wherein obtaining network channel switching information sent by an upper-level parent node device having a connection relationship therewith and sending the network channel switching information to at least a lower-level child node device having a connection relationship therewith comprises:
   receiving the network channel switching information broadcasted via a beacon of the upper-level parent node device having a connection relationship therewith;
   adding the received network channel switching information to a beacon of the node device itself; and
   sending the network channel switching information in the beacon of the node device itself to the at least a lower-level child node device having a connection relationship therewith through a network-wide broadcast.

3. The method according to claim 1, wherein obtaining network channel switching information sent by an upper-level parent node device having a connection relationship therewith and sending the network channel switching information to at least a lower-level child node device having a connection relationship therewith comprises:
   if the node device in the wireless mesh network is a root node device, obtaining network channel switching information sent by a router, and sending the network channel switching information to the at least a lower-level child node device having a connection relationship with the root node device.

4. The method according to claim 3, wherein if the node device in the wireless mesh network is a root node device, after obtaining the network channel switching information sent by the router, the method further comprises:
adjusting a channel switching latency value in the network channel switching information according to current network quality, wherein the channel switching latency value is used to determine a latency time period for each node device to perform a network channel switching.

5. The method according to claim 1, wherein switching from a current channel to a target channel according to the received network channel switching information comprises:
obtaining a channel switching latency value and the target channel to be switched to from the network channel switching information;
determining a latency time period to perform the network channel switching according to the channel switching latency value; and
switching from the current channel to the target channel when the latency time period is lapsed.

6. The method according to claim 1, wherein if the network channel switching information is lost, triggering an all-channel scanning to search for the upper-level parent node device having a connection relationship therewith comprises:
if a root node device in the wireless mesh network loses the network channel switching information, triggering the all-channel scanning to search for a historically connected router;
and obtaining the channel switching latency value and the target channel to be switched to from the upper-level parent node device and generating the network channel switching information comprises:
obtaining the channel switching latency value and the target channel to be switched to from the historically connected router, and generating the network channel switching information.

7. The method according to claim 1, wherein triggering an all-channel scanning to search for the upper-level parent node device having a connection relationship therewith comprises:
if the node device in the wireless mesh network is a non-root node device, and the non-root node device fails to scan out an upper-level parent node device having a connection relationship therewith within a preset time period, searching for another node device of the wireless mesh network; and
taking the another node device identified from the searching as the upper-level parent node device having a connection relationship therewith.

8. A device, wherein the device is a node device in a wireless mesh network, the device comprising:
one or more processors;
a storage device for storing one or more programs,
wherein the one or more programs, when executed by the one or more processors, cause the one or more processors to perform the steps of:
obtaining network channel switching information sent by an upper-level parent node device having a connection relationship therewith and sending the network channel switching information to at least a lower-level child node device having a connection relationship therewith; and switching from a current channel to a target channel according to the received network channel switching information;
wherein obtaining network channel switching information sent by an upper-level parent node device having a connection relationship therewith comprises:
if the network channel switching information is lost, triggering an all-channel scanning to search for the upper-level parent node device having a connection relationship therewith;
obtaining the channel switching latency value and the target channel to be switched to from the upper-level parent node device, and generating the network channel switching information.

9. A non-transitory computer readable storage medium with a computer program stored thereon, wherein the computer program, when executed by one or more processors, performs a network channel switching method according to claim 1.

10. The device according to claim 8, wherein obtaining network channel switching information sent by an upper-level parent node device having a connection relationship therewith and sending the network channel switching information to at least a lower-level child node device having a connection relationship therewith comprises:
receiving the network channel switching information broadcasted via a beacon of the upper-level parent node device having a connection relationship therewith;
adding the received network channel switching information to a beacon of the node device itself; and
sending the network channel switching information in the beacon of the node device itself to the at least a lower-level child node device having a connection relationship therewith through a network-wide broadcast.

11. The device according to claim 8, wherein obtaining network channel switching information sent by an upper-level parent node device having a connection relationship therewith and sending the network channel switching information to at least a lower-level child node device having a connection relationship therewith comprises:
if the node device in the wireless mesh network is a root node device, obtaining network channel switching information sent by a router, and sending the network channel switching information to the at least a lower-level child node device having a connection relationship with the root node device.

12. The device according to claim 11, wherein if the node device in the wireless mesh network is a root node device, after obtaining the network channel switching information sent by the router, the one or more processors is further caused to perform the steps of:
adjusting a channel switching latency value in the network channel switching information according to current network quality, wherein the channel switching latency value is used to determine a latency time period for each node device to perform a network channel switching.

13. The device according to claim 8, wherein switching from a current channel to a target channel according to the received network channel switching information comprises:
obtaining a channel switching latency value and the target channel to be switched to from the network channel switching information;
determining a latency time period to perform the network channel switching according to the channel switching latency value; and switching from the current channel to the target channel when the latency time period is lapsed.

14. The device according to claim 8, wherein if the network channel switching information is lost, triggering an all-channel scanning to search for the upper-level parent node device having a connection relationship therewith comprises:
- if a root node device in the wireless mesh network loses the network channel switching information, triggering the all-channel scanning to search for a historically connected router;
- and obtaining the channel switching latency value and the target channel to be switched to from the upper-level parent node device and generating the network channel switching information comprises:
- obtaining the channel switching latency value and the target channel to be switched to from the historically connected router, and generating the network channel switching information.

15. The device according to claim 8, wherein triggering an all-channel scanning to search for the upper-level parent node device having a connection relationship therewith comprises:
- if the node device in the wireless mesh network is a non-root node device, and the non-root node device fails to scan out an upper-level parent node device having a connection relationship therewith within a preset time period, searching for another node device of the wireless mesh network; and
- taking the another node device identified from the searching as the upper-level parent node device having a connection relationship therewith.

\* \* \* \* \*